Feb. 13, 1973  L. N. REED  3,715,934

ACCELERATOR PEDAL

Filed Dec. 3, 1971

INVENTOR
LAWRENCE N. REED

BY
*Learman & McCulloch*
ATTORNEYS 3,715,934
           ACCELERATOR PEDAL
Lawrence N. Reed, Warren, Mich., assignor to Essex
    International, Inc., Fort Wayne, Ind.
       Filed Dec. 3, 1971, Ser. No. 204,588
              Int. Cl. G05g 1/14
U.S. Cl. 74—560                              15 Claims

ABSTRACT OF THE DISCLOSURE

An accelerator pedal adapted for mounting on a throttle linkage including an elongated lever having a laterally extending arm adjacent one end thereof comprises a pedal body having spaced apart pairs of mounting projections extending from one side thereof and between which the arm of the throttle lever is rotatably accommodated. The projections include flexible retaining fingers which extend toward the pedal body along converging lines. Each retaining finger has a free end which bears against the lever arm so as rotatably to retain the pedal body on the arm. A spring biases the pedal body to rotate in one direction and the lever arm includes an extension which is engageable with the pedal body to limit its rotation.

---

The invention disclosed herein relates to accelerator pedals for automotive vehicles and more particularly to a molded, one piece accelerator pedal having snap-on means for mounting the pedal on the operating lever of a throttle linkage in such manner as to permit rocking of the pedal.

A vehicle conventionally is equipped with a foot operated throttle linkage on which a pedal is mounted to provide a fairly broad contact area for the foot of the vehicle's driver. Some of the known accelerator pedals have a pivotal or rockable connection with the linkage so as to enable the pedal to rock relatively to the linkage during movements of the latter, thereby avoiding relative movement between the pedal and the operator's foot. Some of the known pedals are pivoted not only to the throttle operating linkage, but also to the floorboard of the vehicle. In some instances, the pivotal connection between the pedal and the floorboard is separable to enable the lower end of the pedal to be lifted to facilitate cleaning of the floorboard or carpet. Others of the known accelerator pedals terminate short of the vehicle's floorboard to provide space to effect cleaning of the floorboard or carpet.

The means for mounting conventional accelerator pedals heretofore have included multiple parts or ball and socket type connections. The multiple part mounting means usually comprise screws, washers, and the like which must be fitted together after the accelerator pedal is connected to the throttle linkage. The location of the accelerator pedal in a conventional vehicle is such that the fitting together of the multiple parts of its mounting apparatus or the assembling of ball and socket devices is awkward and time consuming. In addition, ball and socket connections necessitate relative movement of the parts during manipulation of the throttle linkage with the result that the connection of the pedal to the throttle linkage necessarily must have some looseness or play which frequently results in a wobbly and insecure mounting.

An object of this invention is to provide an accelerator pedal having unitary, one piece, snap-on means for mounting the pedal on a throttle linkage and which overcomes the disadvantages referred to above.

Another object of the invention is to provide an accelerator pedal of the character referred to and in which the pedal is capable of substantial rocking movement in one direction relative to its support, but is limited in rocking movement in the opposite direction.

A further object of the invention is to provide an accelerator pedal having unitary mounting means formed integrally with the pedal itself so as to minimize the cost of the pedal and the time and cost of assembling it with a vehicle's throttle linkage.

Other objects and advantages of the invention will be pointed out specifically or will become apparent from the following description when it is considered in conjunction with the appended claims and the accompanying drawings, in which:

Figure 1:
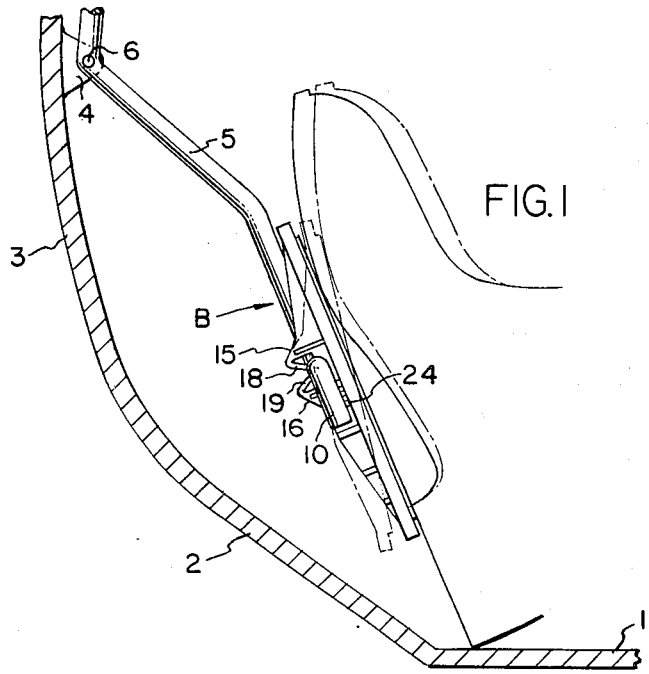
FIG. 1 is a fragmentary, vertical sectional view through a floorboard of a conventional automotive vehicle and illustrating a portion of the throttle linkage assembled with a pedal constructed according to the invention.
Figure 2:
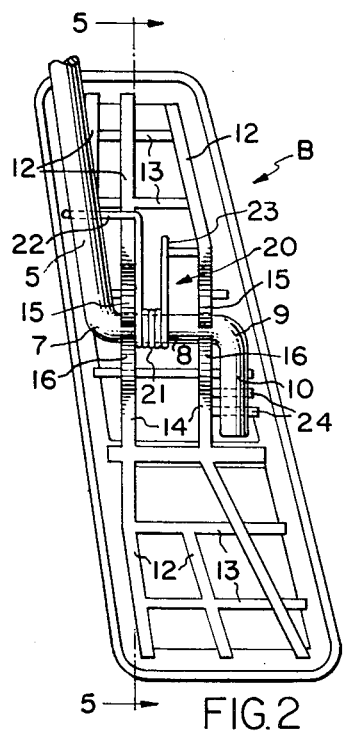
FIG. 2 is a bottom plan view on an enlarged scale of the pedal illustrating its assembly with the throttle linkage.

A pedal constructed in accordance with the invention is adapted for use in a conventional vehicle having a floorboard 1 including an upwardly inclined toe board 2 which merges with an upstanding panel 3. The panel 3 conventionally is provided with a bracket 4 on which an elongate, circular cross section lever 5 constituting part of the vehicle's throttle linkage is pivoted as at 6. The lever 5 is bent adjacent its lower end as at 7 to form a laterally extending arm 8 which, in turn, is bent as at 9 to form a downwardly extending tongue or extension 10.

The pedal comprises a body B which preferably is molded from a material such as polypropylene having inherent resilient or flexible characteristics of the kind hereafter to be described. The pedal body has at one side thereof an ornamental tread surface 11 upon which the foot of the vehicle's driver is adapted to rest. On the opposite side of the body are molded longitudinal and transverse strengthening ribs 12 and 13, respectively. Two of the longitudinal ribs 12 have portions 14 thereof which parallel each other and extend beyond the other ribs in a direction away from the body B so as to form confronting pairs of spaced apart mounting members or projections 15 and 16. Those portions of the parallel ribs 14 which lie between the pairs of projections 15 and 16 are provided with a semicircular recess 17 formed on the arc of a circle which corresponds substantially to the radius of the arm 8 so as to enable the latter snugly, but rotatably, to be accommodated in the grooves 17.

Each pair of projections 15 is provided with a finger 18 and each pair of projections 16 is provided with a similar finger 19, the fingers 18 and 19 extending toward the body B along lines which converge substantially at the center of the arc on which the groove 17 is formed. Each finger, however, terminates short of the center of the arc by a distance such that a space is provided between the free end of each finger and the body B for the accommodation of the lever arm 8. The space between the free end of each finger and the body corresponds substantially to the diameter to which the grooves 17 are formed. The spacing between the free ends of confronting fingers 18 and 19, however, is less than the thickness or diameter of the lever arm 8.

The lever arm 8 preferably carries a biasing spring 20 having coils 21 surrounding the arm 8 and from one end of which extends a hooked anchor leg 22 which embraces the lever 5. A leg 23 extends from the opposite end of the coils 21 for engagement with the lower surface of the body B so as to bias the latter to rock clockwise as viewed in FIG. 1. Clockwise rotation of the body B is limited, however, by engagement of the tongue 10 with ribs 24 carried by the body B.

Figure 3:
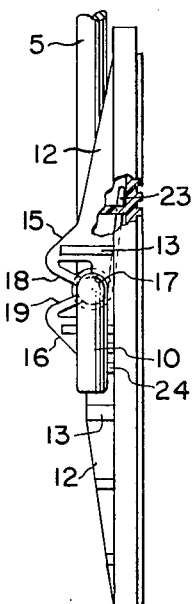
FIG. 3 is a side elevational view partly broken away.
Figure 4:
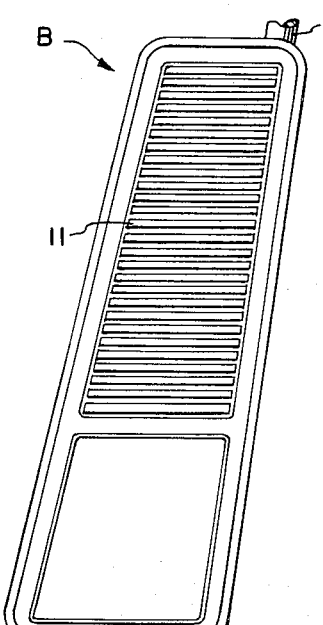
FIG. 4 is a top plan view of the pedal.
Figure 5:
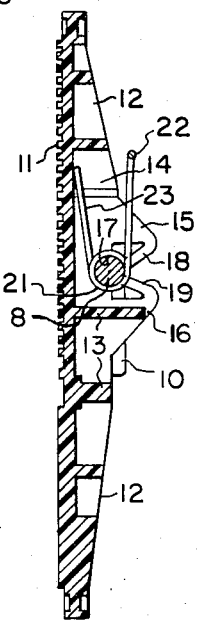
FIG. 5 is a sectional view taken along the line 5—5 of FIG. 2.

To assemble the pedal with the throttle linkage lever 5, the spring 20 is fitted onto the arm 8 by sliding the coil 21 over the tongue 10 and hooking the anchor leg 22 over the lever. The pedal body B then is presented to the lever arm 8 in such manner that the pairs of projections 15 and 16 straddle the loop 21 and the pairs of fingers 18 and 19 straddle the arm 8. The body B then is moved toward the arm 8 so as to cause the latter to engage the confronting pairs of fingers 18 and 19. The retaining fingers should have sufficient flexibility as to permit them to be spread apart a distance sufficient to enable the arm 8 to pass therebetween and seat in the grooves 17. The fingers 18 and 19 should have sufficient resilience as to be restored automatically to their confronting positions once the free ends of the fingers are cleared by the arm 8 so as to enable the fingers to overlie the arm as is best shown in FIGS. 3 and 5.

Assembly of the body B with the lever 5 automatically stresses the spring leg 23 so as to rock the pedal body to a position in which the tongue 10 engages the limit ribs 24. The pedal body thus will be maintained in an upwardly inclined position whenever no external force acts on the pedal body. This is the position of the body shown in chain lines in FIG. 1. The pedal is freely rockable counterclockwise, as viewed in FIG. 1, however, so as to conform to the position of the vehicle driver's foot as is indicated in full lines in FIG. 1. The pedal may be rocked counterclockwise a distance greater than is indicated in FIG. 1, however, so as to facilitate cleaning of the floor and toe board or any carpeting (not shown) covering such members.

Although the fingers 18 and 19 are flexible and resilient the orientation of the fingers in such manner that they converge along lines which intersect the center of the circle on which the grooves 17 are formed enables the fingers to offer powerful resistance to removal of the lever arm 8 from the grooves 17. This is because the fingers 18 and 19 extend along lines in prolongation of the radius of the arm 8 with the result that movement of the arm 8 outwardly of the grooves 17 causes forces to be exerted on the fingers along the longitudinal axes of the fingers. The fingers thus are not subjected to deflection forces, such as are encountered when the lever arm 8 is moved toward seating condition in the grooves 17.

The disclosed embodiment is representative of a presently preferred form of the invention, but it is intended to be illustrative rather than definitive thereof. The invention is defined in the claims.

I claim:

1. An accelerator pedal or the like adapted to be mounted on a supporting arm, said pedal comprising a body; and mounting means carried by said body for mounting said body on a supporting arm, said mounting means comprising at least one pair of members carried by said body at one side thereof and extending in a direction away from said body, said members being spaced apart a distance to accommodate said arm therebetween, each of said members having a finger extending toward said body but terminating short thereof to form a space between said body and the ends of said fingers for the accommodation of said arm.

2. The construction set forth in claim 1 wherein said fingers extend toward said body along converging lines.

3. The construction set forth in claim 1 wherein said fingers are flexible.

4. The construction set forth in claim 1 wherein said one side of said body has an arcuate groove formed therein between said members for the reception of said arm.

5. The construction set forth in claim 4 wherein said fingers extend toward said body along lines which converge substantially at the center of the arc on which said groove is formed.

6. The construction set forth in claim 5 wherein the free ends of said fingers terminate short of the center of said arc by a distance corresponding substantially to the radius of said arc.

7. A pedal operated construction for a vehicle accelerator mechanism or the like comprising an elongate lever terminating adjacent one end in a laterally extending arm; a pedal body; and means mounting said body on said arm, said mounting means comprising at least one pair of confronting, spaced apart members extending from one side of said body and receiving said arm therebetween, each of said members including a finger extending toward said body and terminating in a free end which engages said arm.

8. The construction set forth in claim 7 including spring means acting between said lever and said body and biasing the latter to rock in one direction about said arm.

9. The construction set forth in claim 8 including means for limiting rocking movement of said body in said one direction.

10. The construction set forth in claim 9 wherein said limiting means comprises an extension on said arm engageable with said body.

11. The construction set forth in claim 7 wherein said fingers extend toward said body along converging lines.

12. The construction set forth in claim 11 wherein said fingers are flexible and wherein the free ends of said fingers are spaced from one another a distance less than the thickness of said arm.

13. The construction set forth in claim 7 wherein said one side of said body has an arcuate groove between said members and in which said arm is accommodated.

14. The construction set forth in claim 13 wherein said fingers extend toward said body along lines which converge substantially at the center of the arc on which said groove is formed.

15. The construction set forth in claim 14 wherein the free ends of said fingers terminate short of the center of said arc by a distance corresponding substantially to the radius of said arc.

References Cited

UNITED STATES PATENTS

| | | | |
|---|---|---|---|
| 3,125,896 | 3/1964 | Beisel et al. | 74—560 |
| 3,275,094 | 9/1966 | Kennedy | 74—560 X |

CHARLES J. MYHRE, Primary Examiner

F. D. SHOEMAKER, Assistant Examiner

U.S. Cl. X.R.

29—453